United States Patent
Barbir et al.

(10) Patent No.: US 9,531,692 B2
(45) Date of Patent: Dec. 27, 2016

(54) METHOD OF SECURING MOBILE APPLICATIONS USING DISTRIBUTED KEYS

(71) Applicant: Bank of America Corporation, Charlotte, NC (US)

(72) Inventors: Abdulkader Barbir, Ontario (CA); Eileen D. Bridges, Fort Mill, SC (US); Davindar Gill, Palatine, IL (US); Lawrence R. LaBella, Bellmore, NY (US); Craig Worstell, Gig Harbor, WA (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 14/491,526

(22) Filed: Sep. 19, 2014

(65) Prior Publication Data
US 2016/0087950 A1    Mar. 24, 2016

(51) Int. Cl.
*H04L 9/00* (2006.01)
*H04L 29/06* (2006.01)

(52) U.S. Cl.
CPC .................. *H04L 63/062* (2013.01)

(58) Field of Classification Search
USPC .. 713/171, 165, 168, 183; 726/1, 6; 380/277
See application file for complete search history.

(56) References Cited

U.S. PATENT DOCUMENTS

| | | | |
|---|---|---|---|
| 2003/0026273 A1* | 2/2003 | Davison | H04L 12/2856 370/409 |
| 2004/0003241 A1* | 1/2004 | Sengodan | H04L 9/3236 713/168 |
| 2007/0050212 A1* | 3/2007 | Kearby | G06F 19/3418 705/3 |
| 2007/0055731 A1* | 3/2007 | Thibeault | H04L 12/581 709/204 |
| 2010/0111307 A1* | 5/2010 | Hu | H04L 9/0841 380/277 |
| 2011/0055585 A1* | 3/2011 | Lee | H04L 9/0844 713/183 |
| 2011/0302398 A1* | 12/2011 | Ureche | H04L 9/0822 713/2 |
| 2012/0163581 A1* | 6/2012 | Lieber | H04L 9/0894 380/28 |
| 2012/0239577 A1* | 9/2012 | Wolfs | G06Q 20/32 705/64 |
| 2012/0243687 A1* | 9/2012 | Li | H04L 9/085 380/277 |
| 2013/0046985 A1* | 2/2013 | Allen | H04L 9/0825 713/171 |

(Continued)

*Primary Examiner* — Sayed Beheshti Shirazi
(74) *Attorney, Agent, or Firm* — Michael A. Springs; Moore & Van Allen PLLC; Peter B. Stewart (57) ABSTRACT

Aspects of the present disclosure are directed to methods and systems for securing mobile computing applications with distributed keys. In one aspect, a computer implemented method or computer readable media include steps electronically receiving, at a computer processor of a computing device, a first security key fragment based on a user input to the computing device; electronically receiving, at the computer processor, a second security key fragment from a network connected storage entity; and electronically concatenating, at the computer processor, the first security key fragment and the second security key fragment to generate a third security key.

18 Claims, 7 Drawing Sheets

(56) References Cited

U.S. PATENT DOCUMENTS

| | | | | |
|---|---|---|---|---|
| 2013/0124292 A1* | 5/2013 | Juthani | .................... | G06F 21/41 |
| | | | | 705/14.26 |
| 2013/0125221 A1* | 5/2013 | Agrawal | ............... | H04L 9/3226 |
| | | | | 726/6 |
| 2013/0212385 A1* | 8/2013 | Schechter | ............... | G06F 21/31 |
| | | | | 713/168 |
| 2014/0032935 A1* | 1/2014 | Kim | .................... | G06F 21/6218 |
| | | | | 713/193 |
| 2014/0139318 A1* | 5/2014 | Malpani | .................. | G06F 21/32 |
| | | | | 340/5.82 |
| 2014/0230007 A1* | 8/2014 | Roth | .................... | G06F 21/6209 |
| | | | | 726/1 |
| 2015/0195278 A1* | 7/2015 | Plotkin | ............... | H04L 63/0861 |
| | | | | 713/186 |
| 2015/0379286 A1* | 12/2015 | Nordback | ........... | G06F 21/6209 |
| | | | | 713/165 |
| 2016/0034708 A1* | 2/2016 | Shim | .................... | G06F 21/6245 |
| | | | | 713/186 |

\* cited by examiner

METHOD OF SECURING MOBILE APPLICATIONS USING DISTRIBUTED KEYS

BACKGROUND

Mobile device computing can be used with cloud computing technology. Electronic Data residing on the mobile device may be vulnerable to unauthorized individuals or software seeking to obtain the data. Data on the mobile device should be secure from unauthorized distribution. Mobile devices use e-commerce and Internet applications to operate and transmit data over a world-wide interconnected communications network. Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Numerous consumers use the Internet, among things to purchase products on-line, locate special events, read news stories, pay bills or perform on-line banking Numerous business establishments are connected to the Internet to provide products and services to the consumer or perform business-to-business electronic commerce.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to methods and systems for securing mobile computing applications with distributed keys. In one aspect, a computer implemented method or computer readable media include steps of electronically receiving, at a computer processor of a computing device, a first security key fragment based on a user input to the computing device; electronically receiving, at the computer processor, a second security key fragment from a network connected storage entity; and electronically concatenating, at the computer processor, the first security key fragment and the second security key fragment to generate a third security key.

In a further aspect of the present disclosure includes a computer implemented method in which include a step of electronically encrypting, at the computer processor, a data encryption key using the third key as a seed. In a further aspect, the method may include electronically encrypting, at the computer processor, data stored in a computer readable memory of the computing device using the encryption key.

In yet a further aspect, the present disclosure includes a computer implemented method and computer readable media with steps of electronically decrypting a hash challenge component, at the computer processor; and electronically decrypting, at the computer processor, the previously encrypted data encryption key using the third key based on a comparison of the hash challenge component.

In yet a further aspect, the present disclosure includes a computer implemented method and computer readable media with steps of determining whether the previously encrypted data encrypting key has been decrypted a predetermined number of times to a threshold amount; in responsive to reaching the threshold amount, electronically receiving, at the computer processor, a different second security key fragment from the network connected storage entity; electronically concatenating, at the computer processor, the first security key fragment and the different second security key fragment to generate a new third security key; and electronically encrypting, at the computer processor, the data encryption key using the new third key as a seed.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
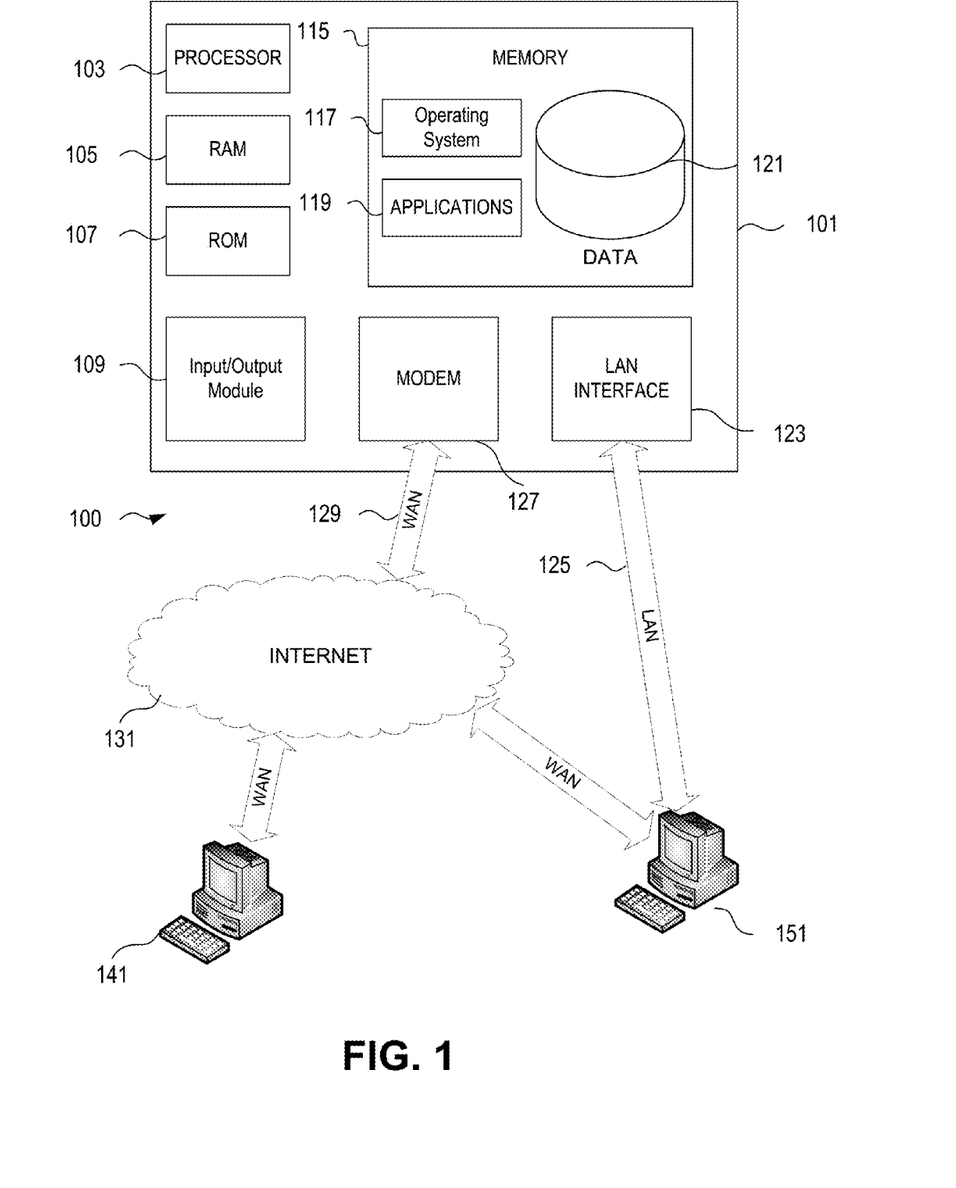
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
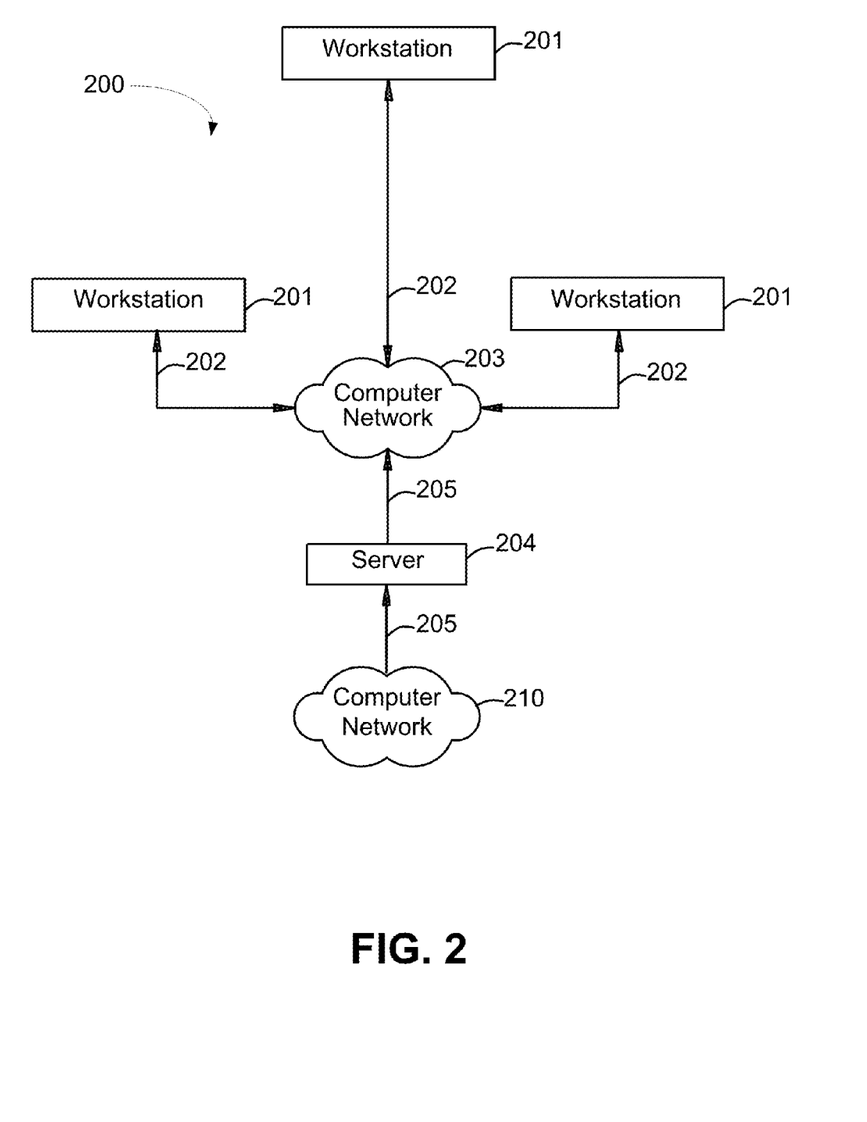
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203, 210 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine. The steps that follow in the Figures may be implemented by one or more of the components in FIGS. 1 and 2 and/or other components, including other computing devices.

Figure 3:
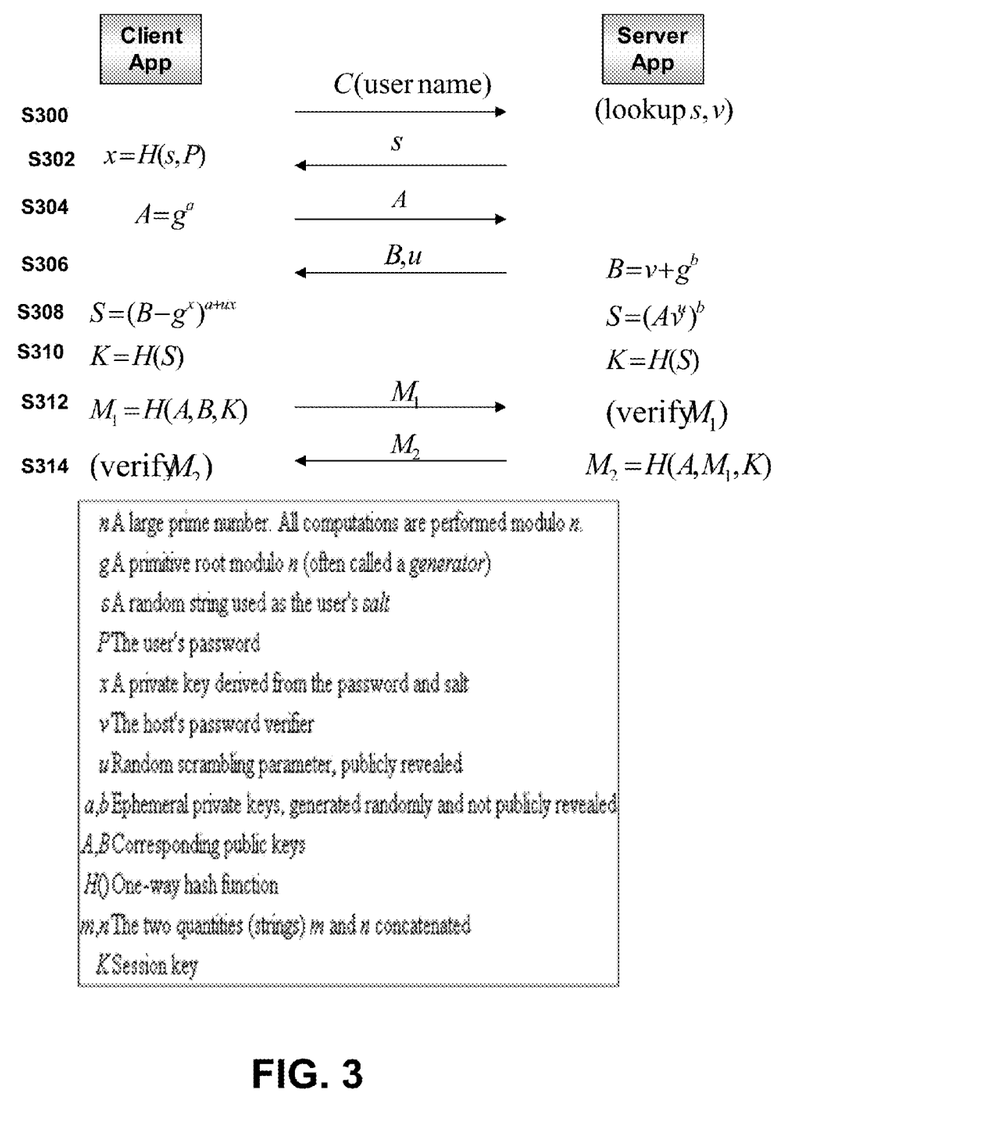
FIG. 3 depicts an illustrative process in which various aspects of the present disclosure may be implemented in accordance with one or more example embodiments.

Aspects of the present disclosure may employ Secure Remote Password (SRP) protocol which is an implementation of a public key exchange handshake described in the IETF RFC 2945, Other protocols may be used. A schematic illustration of the SRP protocol process is shown in FIG. 3. SRP provides cryptographically strong network authentication mechanism suitable for negotiating secure connections using a user-supplied password. In the enrollment phase, to establish a password P with Sever application, Client application picks a random salt s, and computes: x=H(s,P), v=g$^x$ In Step S300, client application sends Server application a username, (e.g. username). Server application looks up Client application's password entry and fetches the password verifier v and client application's salt s. The n and g variables are well-known values, agreed to beforehand in the protocol. In Step 302, Server application sends s to Client application. Client application computes its long-term private key x using s and the user's real password P. In Step S304, Client application generates a random number a, 1<a<n, computes its ephemeral public key A=g^a, and sends it to Server application. In Step S306, Server application generates its own random number b, 1<b<n, computes its ephemeral public key B=v+g^b, and sends it back to Client application, along with the randomly generated parameter u.

In Step S308, Client application and Server application compute the common exponential value S=g^(ab+bux) using the values available to each of them. If Client application's password P entered in Step matches the one it originally used to generate v, then both values of S will match. In Step S310, both sides hash the exponential S into a cryptographically strong session key. In Step S312, Client application sends Server application M1 as evidence that the client has the correct session key. Server application computes M1 itself and verifies that it matches what Client application sent to it. In Step S314, Server application sends Client application M2 as evidence that it also has the correct session key (K). Client application may optionally verify M2 itself, accepting only if it matches Server application's value.

Figure 4:
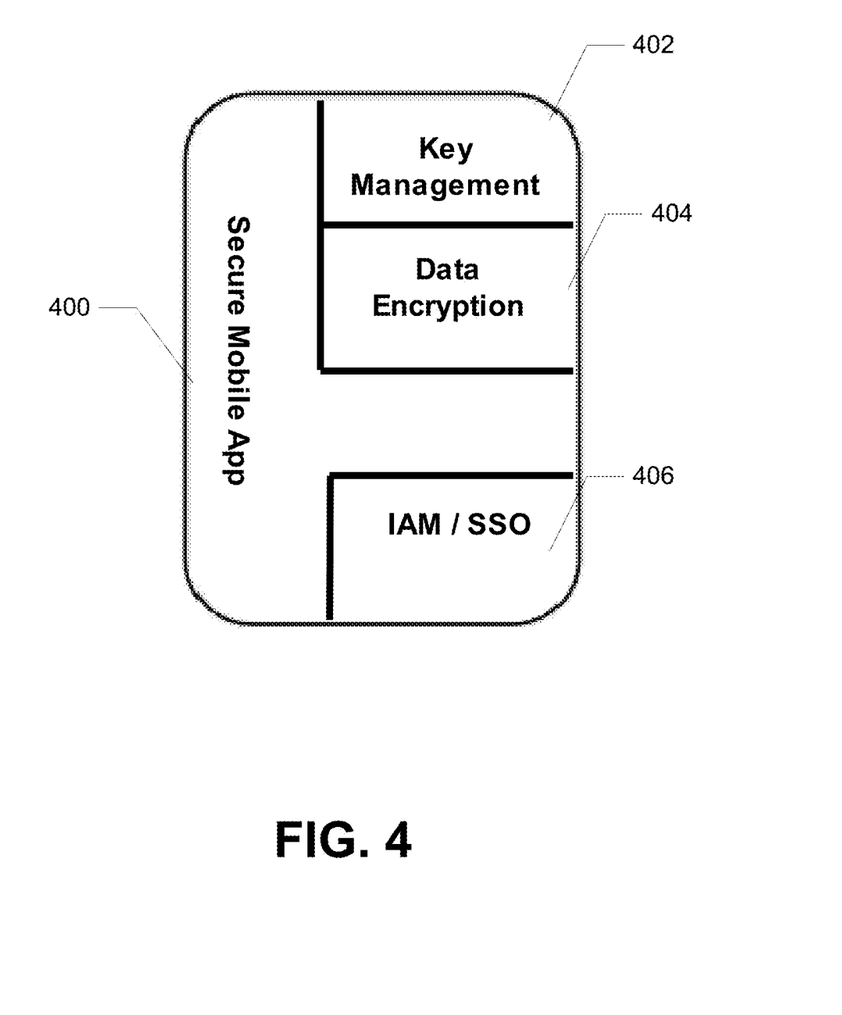
FIG. 4 depicts an illustrative operating environment in which various aspects of the present disclosure may be implemented in accordance with one or more example embodiments.

FIG. 4 depicts an illustrative mobile computing device operating environment in which various aspects of the present disclosure may be implemented. A secure mobile application 400 resides in a computer readable memory. In one implementation, a keychain API 402 may be used to store security keys. An API 406 can assist in single sign-on (SSO) and an Identity and Access Management Services (IAM) provided with an operating system. A data encryption/decryption component 404 is provided for various functions as described herein. The data encryption/decryption component 404 can be implemented with any available computer implemented method, such as Advanced Encryption Standard (AES) 256 or other known available data encryption methods.

Figure 5:
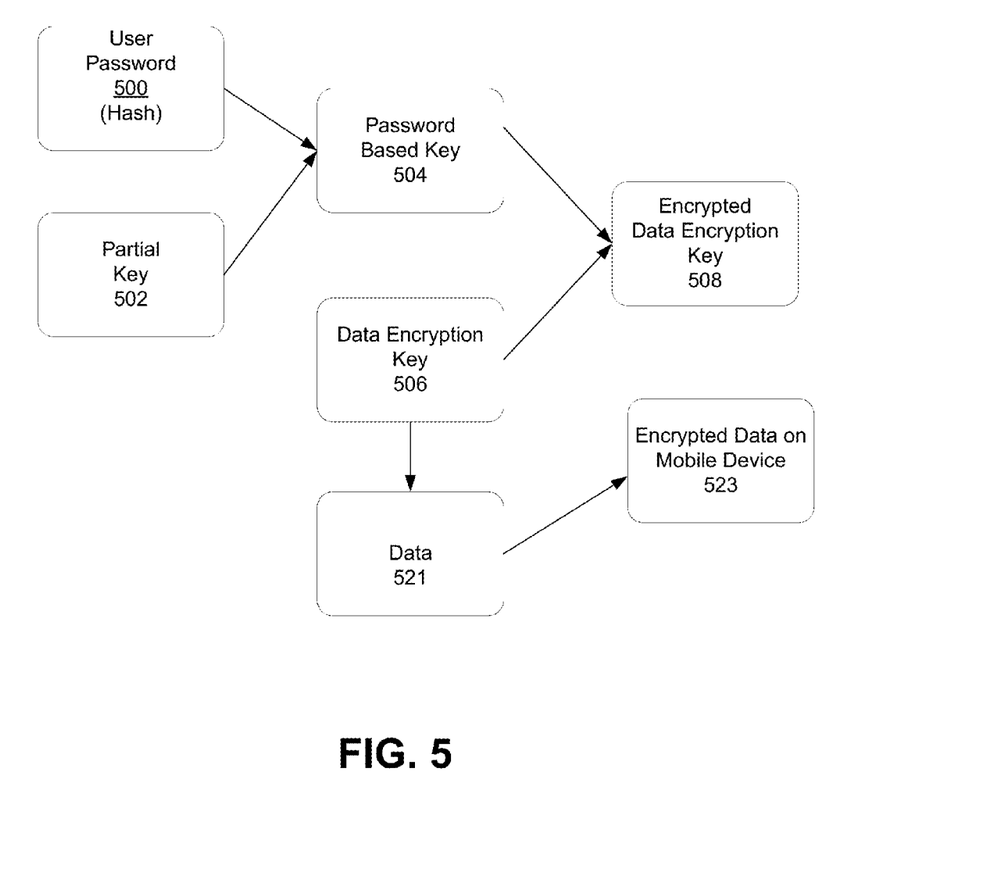
FIG. 5 depicts an illustrative functional process in which various aspects of the present disclosure may be implemented in accordance with one or more example embodiments.

Referring to FIG. 5, a computer implemented process of using secure key fragments for data encryption on a mobile computing device 201 (e.g., mobile smartphone, tablet, slate, and/or laptop; See FIG. 2) or any computing device on an un-trusted network or trusted network. The process can be operated as a software application 400 running on top of a device operating system (OS) or as a component part of the operating system. There is a primary encryption key that will be used for encrypting and decrypting the data on the mobile device 201. That encryption key is stored in a mobile computing device and is encrypted by a using a modifiable complex key that is derived, in-part, from a key fragment, such as from an on-line storage entity server. The encryption key and the key fragment can be stored in memory 115 and accessed by a keychain API 402 on the mobile computing device memory via encrypting it.

A first key segment/fragment 500 is a component provided by the user. For example, the first key segment could be stored in the connected device or it could be manual user input, such as a text username and/or password. In another implementation, the first key segment 500 could be a combination of the computer readable storage on the connected device (for example, unique identification with media access code or RFID of the mobile device) and/or an encrypted user name and/or password. In yet another implementation, the first key segment 500 could be a data representative of a human biometric scanned for authentication (e.g., iris, retina, fingerprint, facial recognition, and/or DNA). In another implementation, the first key fragment 500 can be a password coming from the user name/password from the SRP protocol. Optionally, in one implementation, a one-way hash function known in cryptography can be used to compute a hash value of the first key segment 500. This hash value can be encrypted and stored in the keychain API 402 for later user during the decrypting process.

With continued reference to FIG. 5, a second key segment/fragment 502 (e.g., partial key or partial password) can be provided by a secure online storage entity or server 204 (See FIG. 2). The second key segment 502 is controlled and generated at the server 204. The exchange of the second key segment 502 to the mobile device 201 (See FIG. 2) can be performed during the mobile device handshake with the server, for example or sent along with the SRP protocol session keys. In one example, the second key segment 502 can be embodied in a string of numbers outputted from a random number generator at the server. In another example, the second key segment 502 can be alphanumeric text string of characters or other characters. The first key segment 500 and second segment 502 together become one via concatenation to form what is functionally called a "password based key" 504. The concatenation process can take the form of appending characters of the first key segment 500 (e.g., user password) with the second key segment 502 (e.g., a random number). Hence, the password based key 504 becomes a complex key. Next, the password based key 504 is then used to encrypt a data encryption key 506 to create an encrypted data encryption key 508. It is noted that the unencrypted data encryption key 506 is used to as the key used to encrypt the computer readable data residing in the mobile device memory. Such as encryption method can be the AES 256, for example.

Aspects of the processes improved network infrastructure security without requiring the user to carry/remember anything except the password. In this way of using a first key segment 500 and a second key segment 502, if the user changes the text password or a different biometric of the user is provided or for some reason one of the fragments changes is not necessarily re-encrypt the entire data with a new encryption key. The data encryption key 506 and that encrypted portion 508 of the key is stored and that encrypted portion is done with the partial key fragment 502 so every time the partial key 502 changes, the process can decrypt the old key by itself and re-encrypt it from a new partial key fragment being used in the complex key. In this implementation, data encryption key 506 can be constant based on a pre-defined security policy of the server or network 203, even if the user password or partial key changes. In this process, the transfer of the partial key may occur securely over an un-trusted network at the end of the session between mobile computing device and the server, the system can send a new partial key segment to require a new complex key (e.g., password based key) which will be used to re-encrypt the data encryption key. So the way that encryption key is encrypted it is not residing where the user can go offline and change a part of the fragments that is just encrypted. In various aspects to enhance the security of the mobile device data, the partial key segments 502 can store the information about how long it would be used, by user identification, geo-location (global positioning system (GPS) data), the time of period of the day (e.g., increments of only two, four, or six hours, such morning, afternoon, evening) and other similar data.

Figure 6:
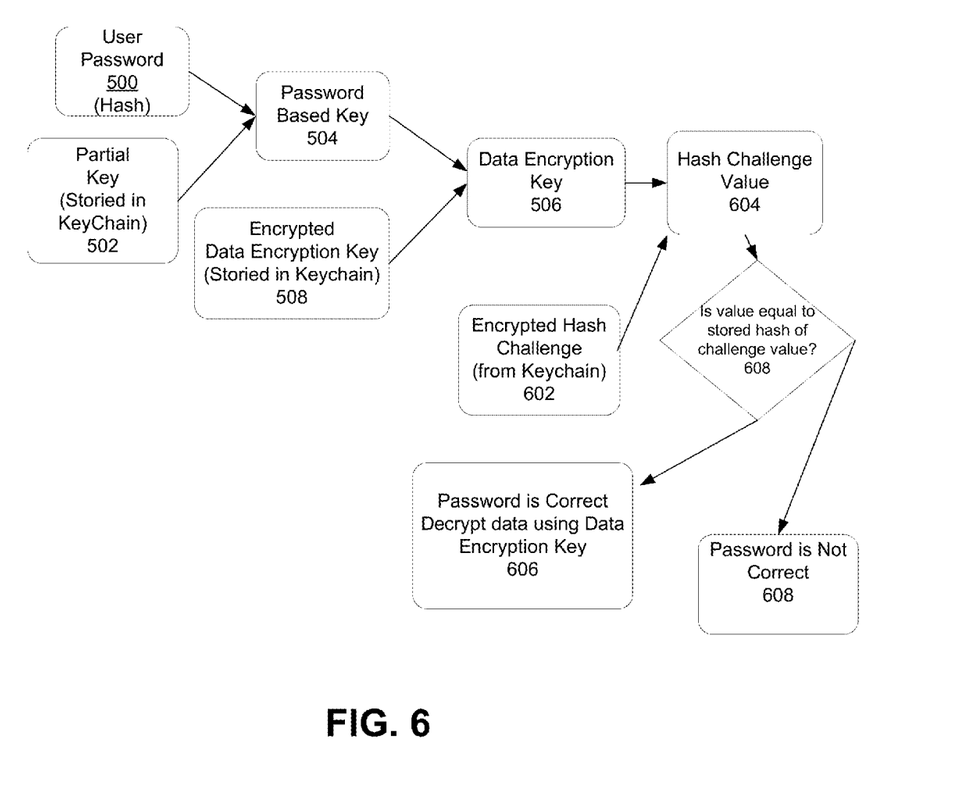
FIG. 6 depicts an illustrative functional process in which various aspects of the present disclosure may be implemented in accordance with one or more example embodiments.

Referring to FIG. 6, the off-line decryption process is similar to the on-line process. The first key segment/fragment 500 is a component provided by the user. For example, the first key segment 500 could be stored in the connected device or it could be manual user input, such as a text username and password. In another implementation, the first key segment 500 could be a combination of the computer readable storage on the connected device (for example, unique identification with media access code or RFID) and an encrypted user name and password. In yet another implementation, the user password could be a biometric scanned authentication (e.g., iris, retina, fingerprint, facial recognition). Optionally, the hash value of the password 500 is calculated later use. The device storage could have one or more pre-generated partial key fragments 502 that could be time stamp or based on a number of actions. For example, the pre-generated partial key fragments 502 can be created by a random number generator. The partial key fragments would be downloaded from a storage entity prior to be disconnected from the network.

The first key segment 500 and one of the pre-generated partial key fragments 502 together become one via concatenation to form what is then embodied as the "password based key" 504. The previously encrypted data encryption key 508 is decrypted with password based key 504 to unlock the data encryption key 506. A hash challenge value 604 is used for supplemented security and comparison for determining whether the user password entered was correct to decrypt the data on the mobile device. The encrypted hash value 602 of the user password 500 stored during the encryption phase is used. The process determines whether the decrypted hash challenge value 604 and the stored hash challenge value are equaled to each other, if the same then the user password is verified as correct to decrypt the data. Hence, the data downloaded or residing on the mobile device can be decrypted using the data encryption key 506. If the hash values do not match then the data is not decrypted.

Figure 7:
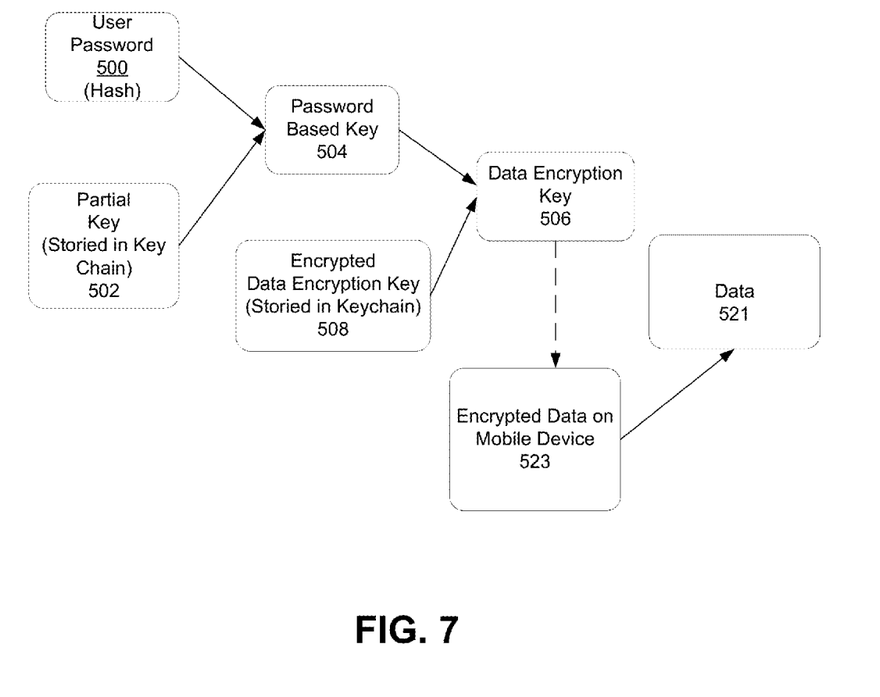
FIG. 7 depicts an illustrative functional process in which various aspects of the present disclosure may be implemented in accordance with one or more example embodiments.

Referring to FIG. 7, the decryption process is generally illustrated in an online environment. The first key segment 500 is provided with the second key segment 502 from the server. These two key segments 500, 502 are known from the encryption phase. Further, the server keeps track of which partial key 502 was sent previously to the mobile device. The first key segment 500 and the second key segment 502 are concatenated together to form the password based key 504. Next, the password based key 504 is used to decrypt the previous data encryption key 506. The data encryption key 506 is then used as input to decrypt the encrypted data 523 residing in the memory storage of the mobile device.

In one example of using the disturbed keys, a user will need to have a key to receive access to encrypted data a higher level up for security (e.g. evaluation of the authorization level). In this example, the user may operate their device and the mobile device is communicating with the server and then the mobile device is downloading documents from the server. The process determines whether the previously encrypted data encrypting key has been decrypted a predetermined number of times to a threshold amount. After a predefined number of downloads (5, 10, 12, 15, for example) the interaction of the security application activates to indicate that another key must be used for further operation. In this context, this additional key is the partial key segment/fragment. In this example, maybe the user's supervisor can provide another key. In this way, the key can be provided for mobility so there are multiple levels of authorization so the partial key fragment can be owned by any domain as far as that user is concerned.

In a further implementation, the offline interaction can happen when a number of pre-defined times or actions before the user needs to go back and connect online again for additional partial key fragments. The process may determine whether the previously encrypted data encrypting key has been decrypted a predetermined number of times to a threshold amount and in responsive to reaching the threshold amount, the process can receive a different second security key fragment from the network connected storage entity. Then concatenate, using the computer processor of the mobile computing device, the first security key fragment 500 and the different second security key fragment 502 to generate a password based key 504. The data encryption key would be decrypted using the new password based key 504 as a seed to the decryption method.

One or more aspects of the disclosure may be implemented with security network data. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer implemented method in a computing device, comprising:
   electronically transmitting a request for access to a computer network associated with a computing device;
   electronically receiving, at a computer processor of the computing device, a first security key fragment based on both (i) a user input to the computing device and (ii) a unique identifier stored on the computing device;
   electronically receiving, at the computer processor, a second security key fragment from a network connected storage entity;
   electronically storing on the computing device the second security key fragment received from the network connected storage entity;
   disconnecting the computing device from the computer network; while the computing device is disconnected from the computer network; electronically concatenating, at the computer processor, the first security key fragment and the second security key fragment to generate a third security key;
   electronically encrypting, at the computer processor, a constant data encryption key using the third security key as a seed;
   electronically encrypting, at the computer processor, data stored in a computer readable memory of the computing device using the constant data encryption key;
   electronically receiving, at the computer processor, a different second security key fragment from the network connected storage entity;
   electronically concatenating, at the computer processor, the first security key fragment and the different second security key fragment to generate a new third security key; and
   in response to receiving the different second security key, (i) electronically decrypting, at the computer processor, the constant data encryption key using the third security key and (ii) electronically encrypting, at the computer processor, the constant data encryption key using the new third security key as the seed.

2. The method according to claim 1, wherein the first security key fragment comprises a biometric parameter of the user and the second security key fragment comprises at least a numeric string of a plurality of randomly generated numbers.

3. The method according to claim 1, wherein the first security key fragment comprises a biometric parameter of the user and the second security key fragment comprises an alphanumeric string of characters.

4. The method according to claim 1, wherein the second security key fragment is based on a network location associated with the request for access by the computing device.

5. The method according to claim 1, wherein the second security key fragment is based on a geographic location associated with the request for access by the computing device.

6. The method according to claim 1, further comprising steps of electronically decrypting a hash challenge component, at the computer processor; and electronically decrypting, at the computer processor, the previously encrypted constant data encryption key using the third key based on a comparison of the hash challenge component.

7. The method according to claim 1, further comprising steps of determining whether the previously encrypted constant data encryption key has been decrypted a predetermined number of times to a threshold amount; wherein the different second security key fragment is received in response to reaching the threshold amount.

8. The method according to claim 1, wherein the user input comprises the user password.

9. The method according to claim 8, comprising:
   while the computing device is disconnected from the computer network:
      electronically receiving the user password;
      electronically decrypting a hash challenge component; and
      electronically determining that the user password is correct based on the hash challenge component;
   wherein the data stored in the computer readable memory of the computing device is electronically decrypting in response to electronically determining that the user password is correct.

10. One or more non-transitory computer readable media storing computer executable instructions that, when executed by at least one processor, cause the at least one processor to perform a method comprising:
- electronically transmitting a request for access to a computer network associated with a computing device;
- electronically receiving, at a computer processor of the computing device, a first security key fragment based on both (i) a user input to the computing device and (ii) a unique identifier stored on the computing device;
- electronically receiving, at the computer processor, a second security key fragment from a network connected storage entity;
- electronically storing on the computing device the second security key fragment received from the network connected storage entity;
- disconnecting the computing device from the computer network; while the computing device is disconnected from the computer network; electronically concatenating, at the computer processor, the first security key fragment and the second security key fragment to generate a third security key;
- electronically encrypting, at the computer processor, a constant data encryption key using the third security key as a seed;
- electronically encrypting, at the computer processor, data stored in a computer readable memory of the computing device using the constant data encryption key;
- electronically receiving, at the computer processor, a different second security key fragment from the network connected storage entity;
- electronically concatenating, at the computer processor, the first security key fragment and the different second security key fragment to generate a new third security key; and
- in response to receiving the different second security key, (i) electronically decrypting, at the computer processor, the constant data encryption key using the third security key and (ii) electronically encrypting, at the computer processor, the constant data encryption key using the new third security key as the seed.

11. The one or more non-transitory computer readable media of claim 10, wherein the first security key fragment comprises a biometric parameter of the user and the second security key fragment comprises at least a numeric string of a plurality of randomly generated numbers.

12. The one or more non-transitory computer readable media of claim 10, wherein the second security key fragment is based on a network location associated with the request for access by the computing device.

13. The one or more non-transitory computer readable media of claim 10, wherein the second security key fragment is based on a geographic location associated with the request for access by the computing device.

14. The one or more non-transitory computer readable media of claim 10, wherein the method comprises electronically decrypting a hash challenge component, at the computer processor; and electronically decrypting, at the computer processor, the previously encrypted constant data encryption key using the third security key based on a comparison of the hash challenge component.

15. The one or more non-transitory computer readable media of claim 10, wherein the method comprises determining whether the previously encrypted constant data encryption key has been decrypted a predetermined number of times to a threshold amount; wherein the different second security key fragment is received in response to reaching the threshold amount.

16. The one or more non-transitory computer readable media of claim 15, wherein the first security key fragment comprises a biometric parameter of the user and the second security key fragment comprises at least a numeric string of a plurality of randomly generated numbers.

17. The one or more non-transitory computer readable media of claim 10, wherein the user input comprises the user password.

18. The one or more non-transitory computer readable media of claim 17, wherein the method comprises:
- while the computing device is disconnected from the computer network:
  - electronically receiving the user password;
  - electronically decrypting a hash challenge component; and
  - electronically determining that the user password is correct based on the hash challenge component;
- wherein the data stored in the computer readable memory of the computing device is electronically decrypting in response to electronically determining that the user password is correct.

* * * * *